(12) United States Patent
Lee et al.

(10) Patent No.: US 9,890,748 B2
(45) Date of Patent: Feb. 13, 2018

(54) METHOD FOR CALCULATING OXYGEN CONCENTRATION IN COMBUSTION CHAMBER

(71) Applicant: HYUNDAI MOTOR COMPANY, Seoul (KR)

(72) Inventors: JangSu Lee, Gyeonggi-do (KR); Seungcheol Han, Chungcheongbuk-do (KR)

(73) Assignee: Hyundai Motor Company, Seoul (KR)

( * ) Notice: Subject to any disclaimer, the term of this patent is extended or adjusted under 35 U.S.C. 154(b) by 148 days.

(21) Appl. No.: 14/956,081

(22) Filed: Dec. 1, 2015

(65) Prior Publication Data

US 2017/0009710 A1    Jan. 12, 2017

(30) Foreign Application Priority Data

Jul. 7, 2015   (KR) .................. 10-2015-0096268

(51) Int. Cl.

| F02D 21/00 | (2006.01) |
|---|---|
| F02M 26/47 | (2016.01) |
| F02D 21/08 | (2006.01) |
| F02D 35/02 | (2006.01) |
| F02M 26/01 | (2016.01) |
| F02D 41/00 | (2006.01) |

(Continued)

(52) U.S. Cl.
CPC ......... *F02M 26/47* (2016.02); *F02D 13/0207* (2013.01); *F02D 21/08* (2013.01); *F02D 35/02* (2013.01); *F02D 41/0062* (2013.01); *F02D 41/1446* (2013.01); *F02D 41/1448* (2013.01); *F02D 41/1458* (2013.01); *F02M 26/01* (2016.02); *F02M 26/05* (2016.02); *F02M 26/23* (2016.02); *F02D 2041/001* (2013.01); *F02D 2200/0402* (2013.01); *F02D 2200/0406* (2013.01); *F02D 2200/0411* (2013.01); *F02D 2200/0614* (2013.01); *F02D 2200/101* (2013.01); *Y02T 10/47* (2013.01)

(58) Field of Classification Search
CPC .... F02M 26/47; F02M 26/01; F02B 13/0207; F02B 13/0261; F02D 41/006; F02D 41/0062
USPC ........................................................ 701/108
See application file for complete search history.

(56) References Cited

U.S. PATENT DOCUMENTS

| 5,590,632 A * | 1/1997 | Kato .................. F01L 1/34 123/480 |
|---|---|---|
| 6,182,636 B1 * | 2/2001 | Russell ............... F02D 13/0215 123/399 |

(Continued)

FOREIGN PATENT DOCUMENTS

| JP | 2001221105 A | 8/2001 |
|---|---|---|
| JP | 2006189013 A | 7/2006 |
| JP | 2013194586 A | 9/2013 |

*Primary Examiner* — Thomas Moulis
(74) *Attorney, Agent, or Firm* — Brinks Gilson & Lione (57) ABSTRACT

Provided is a method for calculating an oxygen concentration in a combustion chamber, including: calculating volume efficiency of the combustion chamber while a variable valve lift is in an on state and the volume efficiency of the combustion chamber and the volume of internal EGR from the volume of the combustion chamber while the variable valve lift is in an off state; and calculating a mass of the internal EGR from the pressure of an exhaust manifold, the temperature of the exhaust manifold, and the volume of the internal EGR.

5 Claims, 4 Drawing Sheets

(51) Int. Cl.
*F02D 41/14* (2006.01)
*F02M 26/05* (2016.01)
*F02M 26/23* (2016.01)
*F02D 13/02* (2006.01)

(56) References Cited

U.S. PATENT DOCUMENTS

| | | | | |
|---|---|---|---|---|
| 6,295,970 | B1* | 10/2001 | Kawakami | F02D 13/0219 123/406.47 |
| 2003/0164163 | A1* | 9/2003 | Lei | F01L 1/146 123/568.14 |
| 2007/0074707 | A1* | 4/2007 | Ogawa | F02D 13/0265 123/568.14 |
| 2007/0215095 | A1* | 9/2007 | Kakuya | F02D 37/02 123/295 |
| 2010/0292811 | A1* | 11/2010 | Schwarte | F02D 41/2451 700/29 |
| 2013/0245967 | A1* | 9/2013 | Hagari | F02D 41/18 702/45 |
| 2014/0026539 | A1* | 1/2014 | Kurtz | F02D 41/024 60/273 |
| 2014/0261344 | A1* | 9/2014 | Makino | F02D 41/1446 123/568.26 |
| 2015/0114367 | A1* | 4/2015 | Makino | F02D 41/0072 123/568.21 |
| 2016/0069285 | A1* | 3/2016 | Watanuki | F02D 41/0072 701/108 |
| 2017/0089271 | A1* | 3/2017 | Kleinhans | F02D 13/0215 |

* cited by examiner

METHOD FOR CALCULATING OXYGEN CONCENTRATION IN COMBUSTION CHAMBER

CROSS-REFERENCE TO RELATED APPLICATION

This application claims priority to and the benefit of Korean Patent Application No. 10-2015-0096268 filed on Jul. 7, 2015, the entirety of which is hereby incorporated by reference.

FIELD

The present disclosure relates to a method for calculating an oxygen concentration in a combustion chamber.

BACKGROUND

The statements in this section merely provide background information related to the present disclosure and may not constitute prior art.

In general, in an internal combustion engine, fuel and air are received by a cylinder and combusted to form power. When an intake valve is actuated by a driven camshaft the air is into the cylinder while the intake valve is opened. Further, an exhaust valve is actuated by a driven camshaft and the air is discharged from the cylinder while the exhaust valve is opened.

However, an optimal intake valve/exhaust valve operation depends on the revolutions per minute (RPM) of the engine. That is, an appropriate lift or valve opening/closing time varies depending on the RPM of the engine. In order to implement the appropriate valve operation depending on the RPM of the engine, cams that drive the valves are designed in terms of a shape or a variable valve lift (VVL) such that the valves operate as different lifts according to the RPM of the engine.

Further, an Exhaust Gas Recirculation (EGR) device is provided in a general engine system, which reintroduces some (for example, 5 to 20%) exhaust gas discharged from the combustion chamber back into the combustion chamber of the engine. In general, nitrogen oxide (NOx) increases when the ratio of the air in mixed gas is high and combustion is thus normally achieved. Therefore, the EGR device mixes some (for example, 5 to 20%) of the exhaust gas discharged from the engine in the mixed gas again to reduce an oxygen amount in the mixed gas and interrupt the combustion, thereby suppressing generation of NOx.

In this case, an air amount supercharged in the combustion chamber through a turbo charger and an exhaust gas amount recirculated through the EGR device are controlled through a temperature of an exhaust manifold.

We have discovered that in the case where the exhaust gas is reintroduced into the combustion chamber by using the variable valve lift device and the EGR device, when control according to the internal EGR amount and the oxygen concentration in the combustion chamber is not accurately performed, the nitrogen oxide (NOx) increases during acceleration driving.

SUMMARY

The present disclosure provides a method for calculating an oxygen concentration in a combustion chamber, capable of predicting an internal EGR amount and a high-pressure EGR amount.

One form of the present disclosure provides a method for calculating an oxygen concentration in a combustion chamber, including: calculating volume efficiency of the combustion chamber while a variable valve lift is in an on state and calculating the volume efficiency of the combustion chamber and the volume of internal EGR from the volume of the combustion chamber while the variable valve lift is in an off state; and calculating a mass of the internal EGR from the pressure of an exhaust manifold, the temperature of the exhaust manifold, and the volume of the internal EGR.

While the variable valve lift is in the on state, the volume efficiency of the combustion chamber may be modeled from an engine speed, the pressure of the intake manifold, and a difference in pressure between the intake manifold and the exhaust manifold.

While the variable valve lift is in the off state, the volume efficiency of the combustion chamber may be modeled from the engine speed, a fuel amount injected into the combustion chamber, or the pressure of the intake manifold.

The mass of the internal EGR may be calculated from the volume of the internal EGR, the temperature of the exhaust manifold, and the pressure of the exhaust manifold.

The mass of the internal EGR may be calculated from an equation of $Pa*V/(R*Te)$, where, Pa represents the pressure of the exhaust manifold, V represents the volume of the internal EGR, R represents a gas constant, and Te represents the temperature of the exhaust manifold.

The method may further include: calculating the oxygen mass of the internal EGR from the mass of the internal EGR and the oxygen fraction of the exhaust manifold; calculating the oxygen mass of the high-pressure EGR from the mass of the high-pressure EGR and the oxygen fraction of the exhaust manifold; calculating the oxygen mass of intake gas from the oxygen mass of the intake gas and an oxygen fraction in the atmosphere; calculating the oxygen mass in the combustion chamber by summing up the oxygen mass of the internal EGR, the oxygen mass of the high-pressure EGR, and the oxygen mass of the intake gas; and calculating the oxygen concentration in the combustion chamber.

The oxygen fraction of the exhaust manifold may be a ratio of the oxygen mass of the exhaust manifold and a total gas mass of the exhaust manifold.

According to a form of the present disclosure, a system and a method for calculating an oxygen concentration in a combustion chamber can accurately calculate an internal EGR amount and the oxygen concentration in the combustion chamber.

Further, since an intake air amount and boost pressure of a turbocharger in acceleration driving can be accurately controlled according to the calculated internal EGR amount and oxygen concentration in the combustion chamber, an emission amount of nitrogen oxide can be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure application, or uses. It should be understood that throughout the drawings, corresponding reference numerals indicate like or corresponding parts and features.

Parts which are not related with the description are omitted in order to clearly describe the present disclosure and like reference numerals designate like elements throughout the specification.

Further, since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

Hereinafter, an engine system according to an one form of the present disclosure will be described in detail with reference to the accompanying drawings.

Figure 1:
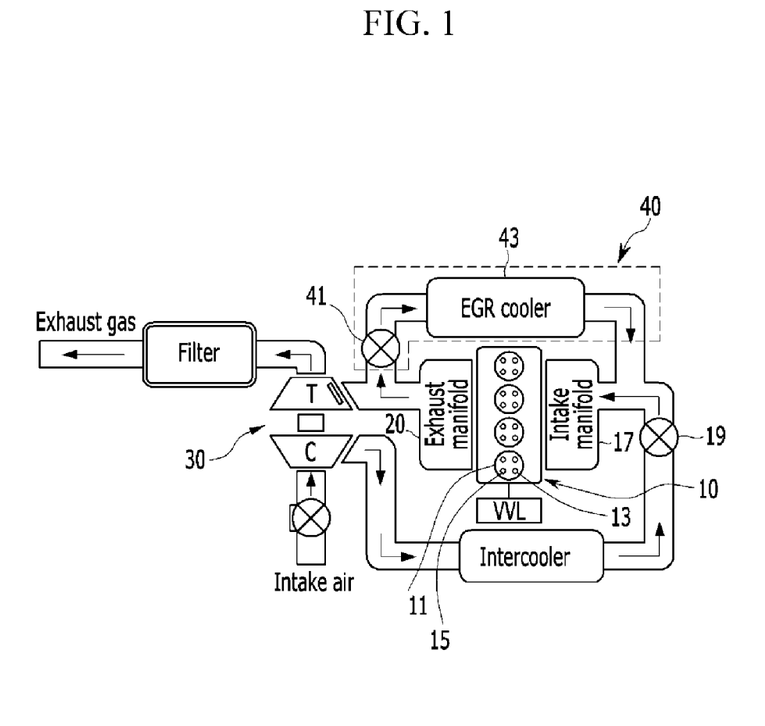
FIG. 1 is a conceptual diagram illustrating a configuration of an engine system according to an exemplary form of the present disclosure.

FIG. 1 is a conceptual diagram illustrating a configuration of an engine system according to one form of the present disclosure.

As illustrated in FIG. 1, the engine system according to one form of the present disclosure includes an engine 10 providing drive force, at least one intake valve 13 and at least one exhaust valve 15 opening/closing a combustion chamber 11, a variable valve lift controlling the lifts of the intake valve 13 and the exhaust valve 15, a turbocharger 30 providing supercharged air to the engine 10, and a high-pressure EGR device 40 extracting exhaust gas at a front end of the turbocharger 30 to recirculate the extracted exhaust gas to the combustion chamber 11.

The engine 10 generates the drive force by combustion of fuel. That is, a cylinder in which the fuel is combusted to generate power is provided in the engine 10 and the intake valve 13 for introducing mixed gas including the fuel to be combusted and the exhaust valve 15 for emitting the combusted gas are provided in the cylinder.

An intake manifold 17 is provided in the engine 10 and mixed gas is supplied to the combustion chamber 11 through the intake manifold 17. In addition, the exhaust manifold 20 is provided in the engine 10 and the exhaust gas combusted in the combustion chamber 11 is supplied to a turbine of the turbocharger 30 through the exhaust manifold 20.

The intake valve 13 and the exhaust valve 15 open and close the combustion chamber 11 by a valve opening/closing mechanism connected to a crankshaft.

The variable valve lift controls the lift of the intake valve 13 or the exhaust valve 15 when the intake valve 13 or the exhaust valve 15 is opened/closed. The variable valve lift generally controls the lift of the intake valve 13 or the exhaust valve 15 in a low lift or high lift mode according to an operating area by using hydraulic pressure.

A configuration and an operation of the variable valve lift are known in a technical field to which the present invention belongs and a detailed description thereof will be omitted.

The turbocharger 30 is constituted by the turbine operated by the exhaust gas and a compressor compressing external air by interlocking with the turbine. The compressor compresses the air introduced from the outside while rotating to supply the compressed air to the combustion chamber 11, thereby improving combustion efficiency of the engine 10.

The exhaust gas recirculation (EGR) device extracts high-temperature exhaust gas formed at the front end of the turbocharger 30 to recirculate the extracted exhaust gas to the combustion chamber 11 of the engine 10. The EGR device includes a high-pressure EGR valve 41 controlling the flow of the EGR and a high-pressure EGR cooler 43 cooling the high-pressure exhaust gas recirculated through the high-pressure EGR valve 41 and introducing the cooled exhaust gas into the combustion chamber 11 of the engine 10 through the intake manifold.

The compressed air passing through the turbocharger 30 is cooled through an intercooler on an intake line to be supplied to the combustion chamber 11 of the engine 10 through a throttle valve 19.

Hereinafter, a system for calculating an oxygen concentration in the combustion chamber 11 according to a form of the present disclosure will be described in detail with reference to the accompanying drawings.

Figure 2:
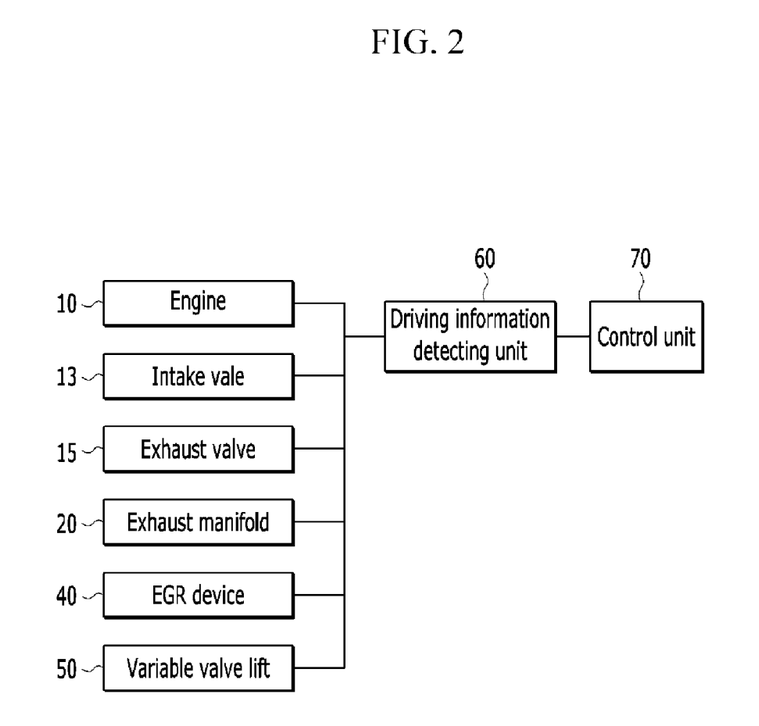
FIG. 2 is a block diagram illustrating a configuration of a system for calculating an oxygen concentration in a combustion chamber according to an exemplary form of the present disclosure.

FIG. 2 is a block diagram illustrating a configuration of a system for calculating an oxygen concentration in the combustion chamber 11 according to a form of the present disclosure.

As illustrated in FIG. 2, the system for calculating an oxygen concentration in the combustion chamber according to one form of the present disclosure includes a driving information detecting unit 60 detecting driving information including an engine speed, a fuel amount injected into the combustion chamber 11, the pressure of an intake manifold 17, the pressure of an exhaust manifold 20, and the temperature of the exhaust manifold 20 and a control unit 70 calculating an internal EGR amount in which exhaust gas discharged from the combustion chamber 11 by a variable valve lift 50 is reintroduced into the combustion chamber 11 from the driving information detected by the driving information detecting unit 60.

In the specification, internal exhaust gas recirculation (EGR) represents that the exhaust gas combusted in the combustion chamber 11 is reintroduced into the combustion chamber 11 through the variable valve lift 50 during an exhaust stroke. In addition, high-pressure exhaust gas recirculation (HP EGR) represents that the exhaust gas combusted in the combustion chamber 11 is reintroduced into the combustion chamber 11 through the high-pressure EGR valve 41.

The control unit 70 may be provided as one or more processors that operate by a set program and the set program is configured to perform each step of the method for calculating an oxygen concentration in the combustion chamber 11 according to one form of the present disclosure.

The control unit 70 calculates volume efficiency of the combustion chamber 11 while the variable valve lift is in an on state (a state in which the variable valve lift operates to introduce the internal EGR into the combustion chamber 11) and the volume efficiency of the combustion chamber 11 and the volume of the internal EGR from the volume of the combustion chamber 11 while the variable valve lift is in an off state (a state in which the variable valve lift does not operate not to introduce the internal EGR into the combustion chamber 11).

More specifically, while the variable valve lift 50 is in the on state, the volume efficiency (hereinafter, referred to as 'first volume efficiency') of the combustion chamber 11 is modeled from the engine speed, the pressure of the intake manifold 17, and a difference in pressure between the intake manifold 17 and the exhaust manifold 20.

In addition, while the variable valve lift is in the off state, the volume efficiency (hereinafter, referred to as 'second volume efficiency') of the combustion chamber 11 is modeled from the engine speed, the fuel amount injected to the combustion chamber 11, or the pressure of the intake manifold 17.

Herein, the volume efficiency of the combustion chamber 11 represents a ratio of an actual air amount introduced into the combustion chamber 11 and a theoretical air amount which may be introduced into the combustion chamber 11. That is, the volume efficiency of the combustion chamber 11 has a relationship of Equation 1 given below.

Volume efficiency=actual air amount introduced into combustion chamber 11/theoretical air amount which may be introduced into combustion chamber 11 [Equation 1]

The control unit 70 calculates the volume of the internal EGR from the first volume efficiency and the second volume efficiency through Equation 2 given below.

Volume of internal EGR=(second volume efficiency−first volume efficiency)/volume of combustion chamber 11 [Equation 2]

The control unit 70 calculates the mass of the internal EGR from the volume of the internal EGR through Equation 3 given below.

$$Mi = Pa*Vi/(R*Te)$$ [Equation 3]

Herein, Mi represents the mass of the internal EGR, Pa represents the pressure of the exhaust manifold 20, Vi represents the volume of the internal EGR, R represents a gas constant, and Te represents the temperature of the exhaust manifold 20.

The control unit 70 calculates the oxygen mass of the internal EGR from the mass of the internal EGR and an oxygen fraction of the exhaust manifold 20. In this case, the mass of the internal EGR has a relationship of Equation 4 given below.

$$Oi = Mi*Ee$$ [Equation 4]

Herein, Oi represents the oxygen mass of the internal EGR, Mi represents the mass of the internal EGR, and Ee represents the oxygen fraction of the exhaust manifold 20. The oxygen fraction of the exhaust manifold 20 represents a ratio of the oxygen mass of the exhaust manifold 20 and the total gas mass of the exhaust manifold 20.

The control unit 70 calculates the oxygen mass in the combustion chamber 11 by summing up the oxygen mass of the internal EGR, the oxygen mass of the high-pressure EGR, and the oxygen mass of intake gas introduced into the combustion chamber 11.

In addition, the control unit 70 calculates an oxygen concentration in the combustion chamber 11 by using a gas mass in the combustion chamber 11 and the oxygen mass in the combustion chamber 11.

That is, the control unit 70 calculates the gas mass in the combustion chamber 11 by summing up the mass of the internal EGR and the mass of the high-pressure EGR, and the mass of the intake gas supplied through the throttle valve 19. In addition, the control unit 70 calculates the oxygen concentration in the combustion chamber 11 by dividing the oxygen mass in the combustion chamber 11 by the gas mass in the combustion chamber 11.

In this case, the oxygen mass of the internal EGR is calculated through Equation 4 given above. The oxygen mass of the intake gas introduced into the combustion chamber 11 is calculated by multiplying a ratio (approximately 23.15 wt %) of oxygen included in the atmosphere in the mass of the air introduced into the combustion chamber 11.

In addition, the oxygen mass of the high-pressure EGR is calculated through a process given below. The oxygen mass of the high-pressure EGR described below may be calculated by using the masses of the intake gas introduced from the outside and the high-pressure EGR, and a thermal equilibrium equation. However, the present disclosure is not particularly limited thereto and the oxygen mass of the high-pressure EGR may be calculated by other methods.

Figure 3:
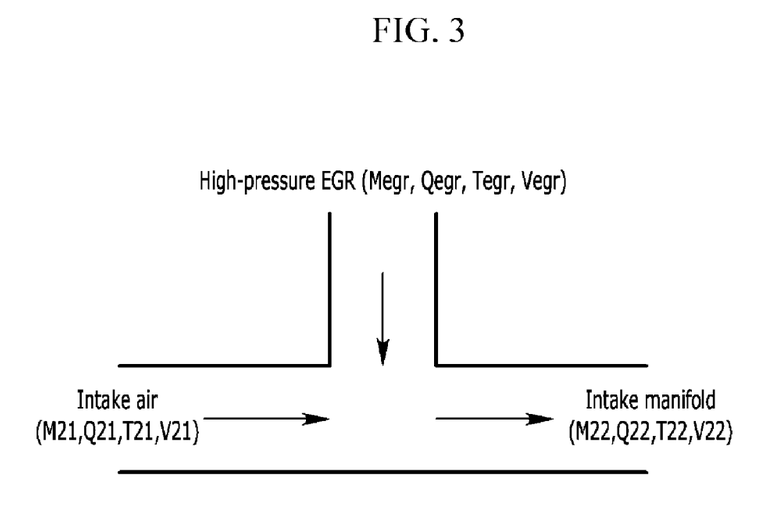
FIG. 3 is a conceptual diagram for describing a method for calculating an oxygen mass of high-pressure EGR according to an exemplary form of the present disclosure.

FIG. 3 is a conceptual diagram for describing a method for calculating an oxygen mass of high-pressure EGR according to a form of the present disclosure.

Referring to FIG. 3, as shown in Equation 5 given below, a mass (M22) of gas introduced into the intake manifold 17 may represent the sum of a mass (M21) of intake gas supplied to the combustion chamber 11 through the throttle valve 19 and a mass (Megr) of recirculation gas supplied to the combustion chamber 11 through the high-pressure EGR device 40.

$$M22 = M21 + Megr$$ [Equation 5]

Further, as shown in Equation 6 given below, a total quantity of heat (Q22) of the gas introduced into the intake manifold 17 may represent the sum of a quantity of heat (Q21) of the intake gas supplied to the combustion chamber 11 through the throttle valve 19 and a quantity of heat (Qegr) of the recirculation gas supplied to the combustion chamber 11 through the high-pressure EGR device 40 by the thermal equilibrium equation.

$$Q22 = Q21 + Qegr$$ [Equation 6]

Equations 7 to 9 given below may be derived from Equation 6 given above.

$$C*M22*T22 = C*M21*T21 + C*Megr*Tegr$$ [Equation 7]

$$M22*T22 = M21*T21 + (M22 - M21)*Tegr$$ [Equation 8]

$$M22*T22 - M22*Tegr = M21*T21 - M21 \& Tegr$$ [Equation 9]

When an ideal gas state equation (PV=mRT) is used in Equation 9, Equations 10 to 12 given below may be obtained.

$$P22*V22/R - P22*V22/R*T22*Tegr = M21*(T21 - Tegr)$$ [Equation 10]

$$P22*V22/R - M21*(T21 - Tegr) = P22*V22*Tegr/R*T22$$ [Equation 11]

$$T22 = P22*V22*Tegr/R/(P22*V22/R + M21*(Tegr + T21))$$ [Equation 12]

A gas temperature (T22) of the exhaust manifold 20 is calculated through Equation 12. Herein, P22, V22, R, M21, and T21 are values detected through the driving information detecting unit 60 and the temperature (Tegr) of the EGR gas may be detected by using an efficiency model of the high-pressure cooler or a temperature sensor provided at a rear end of the high-pressure cooler.

The gas mass (M22) of the exhaust manifold 20 is calculated by using the gas temperature (T22) of the exhaust manifold 20 and the ideal gas state equation (PV=mRT). In addition, the mass (Megr) of the high-pressure EGR is calculated through a difference (M22−M21) between the mass (M21) of the intake gas measured through the driving information detecting unit 60 and the mass (M22) of the gas introduced into the intake manifold 17.

Meanwhile, the oxygen mass of the exhaust manifold 20 is a value acquired by subtracting an oxygen mass consumed for oxidation of the fuel from the oxygen mass in the combustion chamber 11. The oxygen mass consumed for the oxidation of the fuel may be calculated from the fuel amount injected into the combustion chamber 11. In this case, it is assumed that the combustion efficiency in the combustion chamber 11 is 100%.

In addition, the oxygen fraction of the exhaust manifold 20 used in Equation 4 may be obtained by using the oxygen mass of the exhaust manifold 20. The oxygen fraction of the exhaust manifold 20 is set to '0' at an initial stage and the oxygen fraction of the exhaust manifold 20 may be accurately obtained by repeating the aforementioned process.

Hereinafter, a method for calculating an oxygen concentration in a combustion chamber according to a form of the present disclosure will be described in detail with reference to the accompanying drawings.

Figure 4:
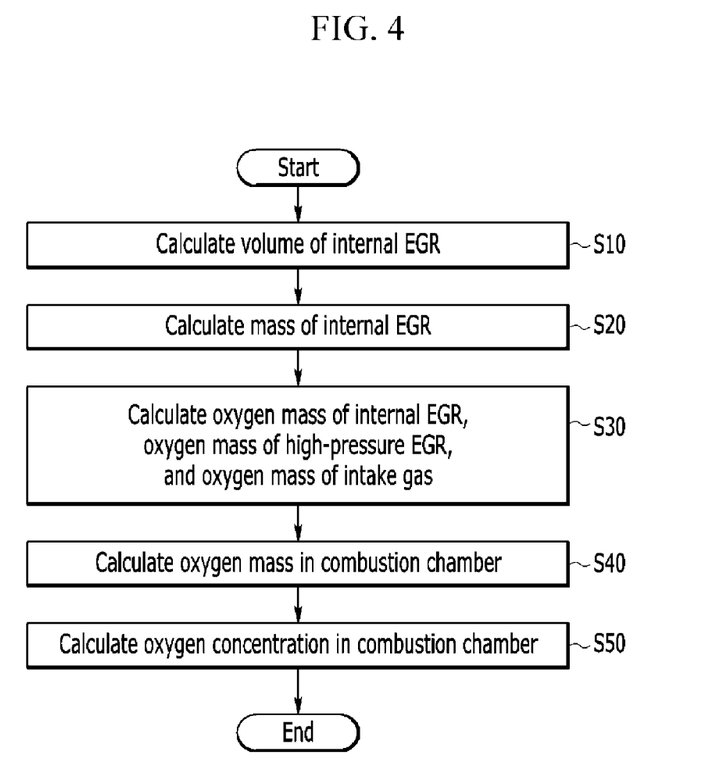
FIG. 4 is a flowchart illustrating a method for calculating an oxygen concentration in a combustion chamber according to an exemplary form of the present disclosure.

FIG. 4 is a flowchart illustrating a method for calculating an oxygen concentration in a combustion chamber according to one form of the present disclosure.

As illustrated in FIG. 4, the control unit 70 calculates the volume efficiency of the combustion chamber 11 while the variable valve lift 50 is in the on state and the volume of the internal EGR from the volume efficiency of the combustion chamber 11 through Equation 2 while the variable valve lift 50 is in the off state (S10).

The control unit 70 calculates the mass of the internal EGR from the pressure of the exhaust manifold 20, the temperature the exhaust manifold 20, and the volume of the internal EGR through Equation 3 given above (S20).

The control unit 70 calculates the oxygen mass of the internal EGR, the oxygen mass of the high-pressure EGR, and the oxygen mass of the intake gas introduced into the combustion chamber 11 from the mass of the internal EGR and the oxygen fraction of the exhaust manifold 20 (S30).

The control unit 70 calculates the oxygen mass in the combustion chamber 11 by summing up the oxygen mass of the internal EGR, the oxygen mass of the high-pressure EGR, and the oxygen mass of intake gas introduced into the combustion chamber 11 (S40).

Last, the control unit 70 calculates the oxygen concentration in the combustion chamber 11 by dividing the oxygen mass in the combustion chamber 11 by the gas mass in the combustion chamber 11 (S50).

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

10: Engine
11: Combustion chamber
13: Intake valve
15: Exhaust valve
17: Intake manifold
19: Throttle valve
20: Exhaust manifold
30: Turbocharger
40: High-pressure EGR device
41: High-pressure EGR valve
43: High-pressure EGR cooler
50: Variable valve lift
60: Driving information detecting unit
70: Control unit

What is claimed is:

1. A method for controlling performance of an engine when an exhaust gas is reintroduced into a combustion chamber using a variable valve lift and an internal EGR, the method comprising:
   using a controller to calculate an oxygen concentration in the combustion chamber in order to control engine performance, wherein the calculation of the oxygen concentration comprises:
   calculating a volume efficiency of the combustion chamber while the variable valve lift is in an on state and calculating the volume efficiency of the combustion chamber and a volume of the internal EGR from a volume of the combustion chamber while the variable valve lift is in an off state; and
   calculating a mass of the internal EGR from a pressure of an exhaust manifold, a temperature of the exhaust manifold, and the volume of the internal EGR;
   while the variable valve lift is in the on state, the volume efficiency of the combustion chamber is modeled from an engine speed, a pressure of an intake manifold, and a difference in pressure between the intake manifold and the exhaust manifold;
   while the variable valve lift is in the off state, the volume efficiency of the combustion chamber is modeled from at least one of an engine speed, a fuel amount injected into the combustion chamber, and a pressure of the intake manifold.

2. The method of claim 1, wherein:
   the mass of the internal EGR is calculated from the volume of the internal EGR, the temperature of the exhaust manifold, and the pressure of the exhaust manifold.

3. The method of claim 2, wherein:
   the mass of the internal EGR is calculated from an equation of $Pa*V/(R*Te)$,
   where, Pa represents the pressure of the exhaust manifold, V represents the volume of the internal EGR, R represents a gas constant, and Te represents the temperature of the exhaust manifold.

4. The method of claim 1, further comprising:
   calculating an oxygen mass of the internal EGR from the mass of the internal EGR and an oxygen fraction of the exhaust manifold;
   calculating the oxygen mass of a high-pressure EGR from a mass of the high-pressure EGR and the oxygen fraction of the exhaust manifold;
   calculating an oxygen mass of intake gas from the oxygen mass of the intake gas and an oxygen fraction in the atmosphere;
   calculating an oxygen mass in the combustion chamber by summing up the oxygen mass of the internal EGR, the oxygen mass of the high-pressure EGR, and the oxygen mass of the intake gas; and
   calculating an oxygen concentration in the combustion chamber.

5. The method of claim 4, wherein:
the oxygen fraction of the exhaust manifold is a ratio of an oxygen mass of the exhaust manifold and a total gas mass of the exhaust manifold.

* * * * *